United States Patent
Okugawa et al.

(10) Patent No.: US 9,403,463 B2
(45) Date of Patent: Aug. 2, 2016

(54) PANEL-SHAPED SEAT BACK FRAME AND SEAT BACK HAVING THE SAME

(71) Applicant: TOYOTA BOSHOKU KABUSHIKI KAISHA, Aichi-ken (JP)

(72) Inventors: Akiyoshi Okugawa, Aichi-ken (JP); Kazuya Suzuki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 12 days.

(21) Appl. No.: 14/305,300

(22) Filed: Jun. 16, 2014

(65) Prior Publication Data

US 2014/0375097 A1    Dec. 25, 2014

(30) Foreign Application Priority Data

Jun. 19, 2013 (JP) ................................ 2013-128252

(51) Int. Cl.
- *B60N 2/68* (2006.01)
- *B60N 2/48* (2006.01)
- *B60N 2/42* (2006.01)

(52) U.S. Cl.
CPC .............. *B60N 2/686* (2013.01); *B60N 2/4249* (2013.01)

(58) Field of Classification Search
CPC .......... B60N 2/68; B60N 2/682; B60N 2/686; B60N 2/4249
USPC .......................................... 297/452.18, 452.2
See application file for complete search history.

(56) References Cited

U.S. PATENT DOCUMENTS

| | | | | |
|---|---|---|---|---|
| 3,011,826 A * | 12/1961 | Bowring | ............... | B64D 11/06 297/383 |
| 3,464,751 A * | 9/1969 | Barecki | ............... | B60N 2/4802 297/216.12 |
| 4,615,561 A * | 10/1986 | Nomura | ................... | A47C 7/74 297/243 |
| 5,575,533 A * | 11/1996 | Glance | ................... | B60N 2/682 297/232 |
| 6,286,902 B1 * | 9/2001 | Yoshimura | ............... | A47C 7/40 297/452.18 |
| 6,679,558 B2 * | 1/2004 | Adams | ................... | B60N 2/682 297/452.2 |
| 6,739,673 B2 * | 5/2004 | Gupta | ................... | B60N 2/686 297/232 |
| 8,714,641 B2 * | 5/2014 | Cyoukyu | ................. | B60N 2/68 297/216 |
| 8,985,695 B2 * | 3/2015 | Baumgarten | ............ | B60N 2/66 297/216.13 |
| 2013/0033083 A1 * | 2/2013 | Sei | ........................ | B60N 2/682 297/452.18 |
| 2013/0257119 A1 * | 10/2013 | Roberts | .................. | B60N 2/427 297/216.13 |

FOREIGN PATENT DOCUMENTS

| | | |
|---|---|---|
| JP | 2011-105050 | 6/2011 |
| JP | 2012-11827 | 1/2012 |

* cited by examiner

*Primary Examiner* — David R Dunn
*Assistant Examiner* — Tania Abraham
(74) *Attorney, Agent, or Firm* — Greenblum & Bernstein, P.L.C.

(57) ABSTRACT

There is provided a panel-shaped seat back frame used for a seat back of a vehicle seat. The panel-shaped seat back frame includes a basic frame member configured by a metallic rod-shaped material, and a panel-shaped forming member which is made of a hard foamed resin and covers the basic frame member.

5 Claims, 2 Drawing Sheets

PANEL-SHAPED SEAT BACK FRAME AND SEAT BACK HAVING THE SAME

BACKGROUND OF THE INVENTION

1. Field of the Invention

The present invention relates to a panel-shaped frame used for a seat back of a vehicle seat and a seat back having the frame.

2. Description of the Related Art

In a field of a seat used for a vehicle such as an automobile, there have been used various seat back frames (hereinafter, simply referred to as a frame) for a seat back configured to support a back of a passenger. For example, a wide panel-shaped frame is used for a seat designed such that a seat back is laid down forwards to thus arrange a backside thereof to be substantially horizontal and a luggage is loaded on the backside. For example, JP-A-2011-105050 discloses a structure referred to as a so-called trunk through in which when a seat back of a seat of a rearmost raw is laid down forwards, the long luggage can be loaded from a trunk room to the seat back.

Generally, a steel plate has been used for such panel-shaped frame. However, since an area of the frame is large, a weight of the seat back increases. Therefore, like a frame 910 shown in FIG. 2, a plate thickness of a steel plate 930 is made as thin as possible so as to lighten the frame, and then, undulations referred to as beads 930a are provided, so that the stiffness necessary for a skeleton of the seat back is supplemented.

Also, even though the seat is designed such that a height of a headrest provided for a seat back cannot be adjusted, a stay 946 cannot be directly fixed to the thin steel plate 930 and needs be fixed through a bracket 945 which is separately prepared. In the meantime, the frame 910 is welded with a plurality of separate components such as a bracket 941 for attaching the seat back to a vehicle body, a bracket 943 for attaching an arm rest to the seat back, a striker 947 of a lock mechanism for fixing the seat back at an upright state, and the like.

A surface material such as a carpet is typically provided on the backside of the steel plate. Even when the surface material is provided on the backside, if the beads are provided below the surface material, the touch feeling would deteriorate when the passenger touches it or the outer appearance of the provided surface material would deteriorate.

SUMMARY OF THE INVENTION

The present invention has been made in view of the above circumstances, and an object of the present invention is to lighten a panel-shaped frame and to flatten a backside thereof.

According to an illustrative embodiment of the present invention, there is provided a panel-shaped seat back frame used for a seat back of a vehicle seat, the seat back frame comprising: a basic frame member configured by a metallic rod-shaped material; and a panel-shaped forming member which is made of a hard foamed resin and covers the basic frame member.

The hard foamed resin may be any one of a polypropylene foam (EPP), a polyethylene foam (EPE), a polystyrene foam (EPS) and a composite foamed resin thereof, which are manufactured by a bead method, or any one of a hard polyurethane foam and a semi-hard polyurethane foam. That is, by using the foamed resin having a lower density than metal as the panel-shaped forming member, it is possible to lighten the frame.

Further, since it is possible to obtain most of stiffness required for the frame mainly by the basic frame member, it is not necessary to provide a reinforcement structure such as beads of a steel plate for the forming member, so that the forming member can be freely shaped depending on purposes. For example, a backside of the forming member may preferably have a flat surface suitable for loading a luggage thereon when the seat back is laid down forwards. Also, a front surface of the forming member is shaped in conformity to a back of a passenger to thus improve a sitting quality.

In the above seat back frame, the basic frame member may include an outer peripheral frame configured by a metallic pipe arranged at a peripheral part within the panel-shaped forming member, and a wire extended between the outer peripheral frame.

Further, the above seat back frame may further integrally comprise a headrest frame part for a headrest configured to support a head part of a passenger, and a part of the outer peripheral frame is shaped to pass through an inside of the headrest frame part. In other words, a part of the outer peripheral frame may be preferably used as a stay of a headrest configured to support a head part, for example. Thereby, it is possible to lighten the frame and to reduce the number of components. Also, when a part of the wire is used as a striker of a lock mechanism of the seat back, it is possible to further reduce the number of components.

According to another illustrative embodiment of the present invention, there is provided a seat back of a vehicle seat for supporting a back of a passenger, the seat back comprising: the above-described seat back frame; and a soft pad member which has a cushioning characteristic and is interposed between a front surface of the seat back frame and a back of the passenger.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Figure 1:
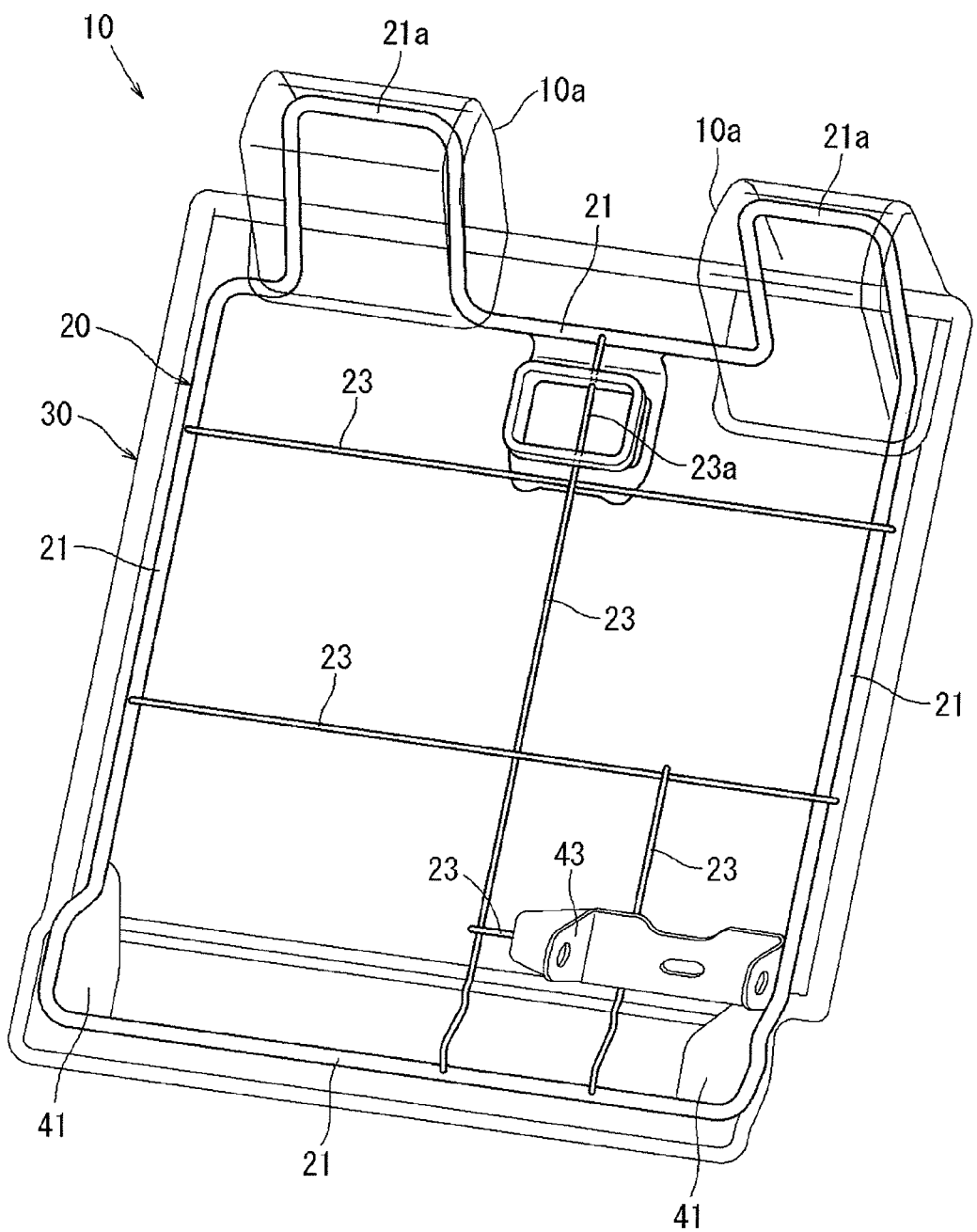
FIG. 1 is a perspective view showing a panel-shaped frame according to an illustrative embodiment of the present invention.

Hereinafter, various illustrative embodiments of the present invention will be described with reference to the drawings. As shown in FIG. 1, a frame 10 includes a basic frame member 20 including a metallic rod-shaped material, and a panel-shaped forming member 30 which is made of a foamed resin and covers the basic frame member 20. A front surface of the frame 10 is covered with a pad member having a cushioning characteristic and made of a soft polyurethane foam and the like, which are then covered with a surface material to thus configure a seat back (not shown). Although the seat back can be used for a general seat of a vehicle, it may be preferable that the seat back is applied to a seat of a rearmost raw of the vehicle and is provided to be laid down forwards and a luggage can be loaded on a backside of the seat back. As shown in FIG. 1, the frame 10 may be integrally provided at an upper part thereof with a headrest frame part 10a.

As the foamed resin, any one of a polypropylene foam, a polyethylene foam, a polystyrene foam, a polystyrene foam and a composite foamed resin thereof, which are manufactured by a bead method, can be used. Also, any one of a hard polyurethane foam and a semi-hard polyurethane foam can be also used as the foamed resin. The foamed resin can be manufactured to have a desired density and hardness by changing a foaming ratio. Basically, the basic frame member 20 contributes to most of stiffness required for a skeleton of the seat back. However, it may be preferable that the forming member 30 has stiffness to some extent by making the foamed resin have appropriate hardness so as to make the basic frame member 20 and the forming member 30 function as the skeleton. The forming member 30 and the basic frame member 20 can be integrated simultaneously with the formation of the forming member 30 by foaming a raw material to include the basic frame member 20. However, the integration may be made after the forming member 30 is separately formed.

The panel-shaped forming member 30 can be freely shaped using a forming method such as a molding, depending on purposes. For example, since a flat surface suitable for loading a luggage thereon can be directly provided for a backside of the forming member 30, it is not necessary to provide a separate backboard for forming the flat surface. Also, even when a luggage is dropped on the backside, the foamed resin of the forming member 30 functions as a buffer material and thus absorbs the shock. Generally, a surface material such as a carpet is provided on the backside of the forming member 30. When the backside has a flat surface, a passenger does not feel an irregularity when the passenger touches the backside. Accordingly, the touch feeling can be improved and the outer appearance can be improved when the surface material is provided.

A front surface of the forming member 30 may have a shape for improving a sitting quality. For example, when a center of the front surface of the forming member 30 is depressed and left and right sides thereof are made to be convex in conformity to a shape of a back of the passenger, it is possible to increase a holding ability of the back. Accordingly, since it is not necessary to form a convex shape referred to as a side support by a pad member only, it is possible to thin the pad member in some case, thereby reducing a using amount of the pad member.

Figure 2:
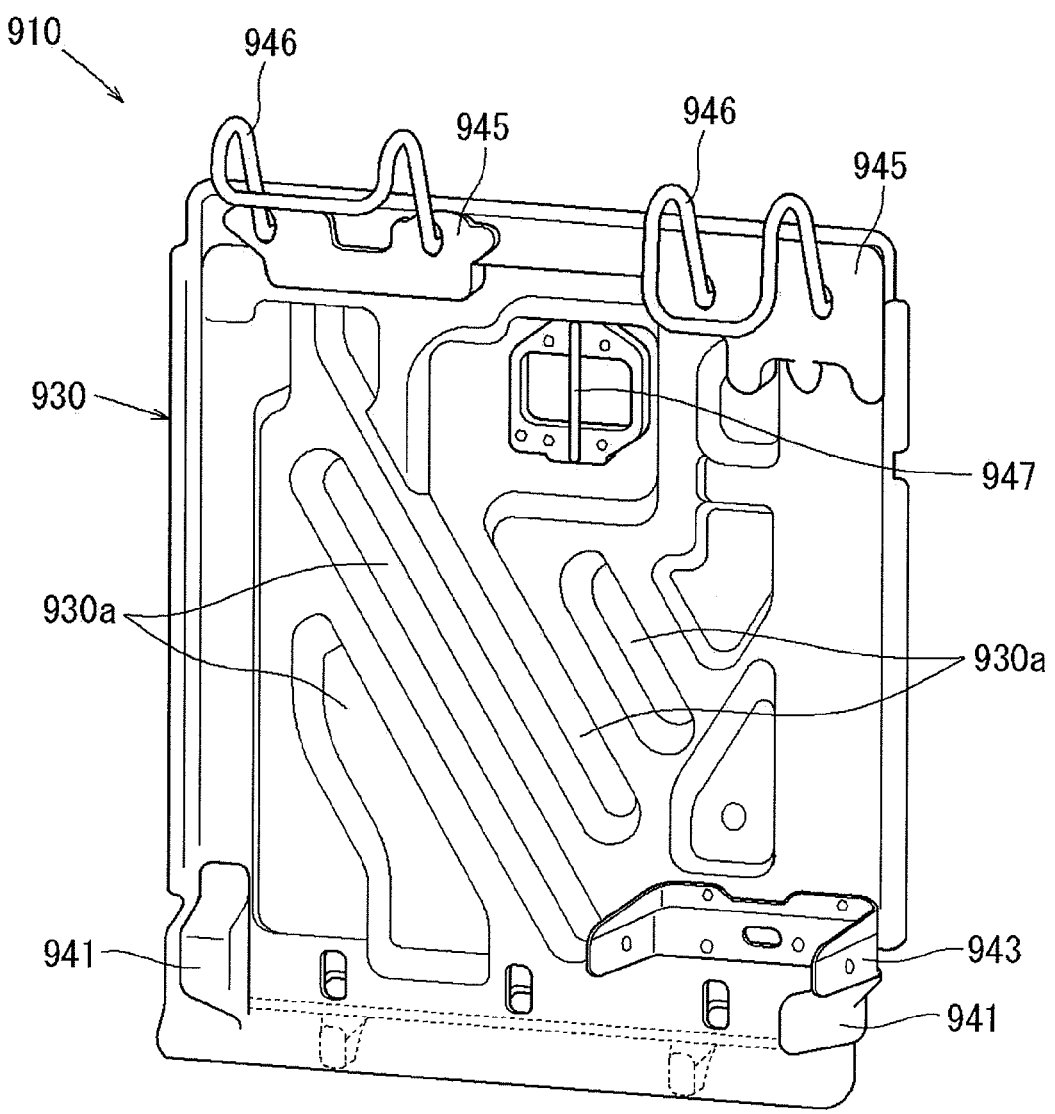
FIG. 2 shows an example of a related-art frame using a steel plate.

As the metallic rod-shaped material configuring the basic frame member 20, a pipe material or wire (wire material) can be used. For example, as shown in FIG. 1, the basic frame member 20 may be preferably configured by an outer peripheral frame 21, which is made of a pipe material and is arranged at a peripheral part within the panel-shaped forming member 30, and wires 21 extended between the outer peripheral frame 21. At this time, as shown in FIG. 1, the outer peripheral frame 21 may be shaped such that a part 21a thereof passes through the headrest frame part 10a. Thereby, the part 21a of the outer peripheral frame 21 contributes to most of stiffness required for a skeleton of the headrest. For example, as shown in FIG. 1, the outer peripheral frame 21 may be bent into a U-shape such that it passes through a peripheral part within the headrest frame part 10a having a convex shape. Thereby, the bracket 945 (refer to FIG. 2) required to fix the stay 946 to the steel plate 930 even for a fixed headrest whose height cannot be adjusted can be omitted to reduce the weight and the number of components. The outer peripheral frame 21 and the wires 23 are fixed to each other by welding. The wires 23 may be provided entirely in a lattice shape where the wires are extended horizontally and vertically at least one by one, as shown in FIG. 1, for example.

A bracket 41 for hinge to attach the seat back to a vehicle body and a bracket 43 for attaching an arm rest to the seat back may be welded to the outer peripheral frame 21 and the wires 23. In some cases, a part of the outer peripheral frame 21 or wire 23 may be made to function as an auxiliary member, so that it is possible to reduce the number of components. For example, in a seat where the seat back can be laid down forwards, a part 23a of the wire 23 may be made to have a striker shape of a lock mechanism for fixing the seat back to the vehicle body, as shown in FIG. 1. Thereby, it is possible to omit a short wire 947 (refer FIG. 2), which is welded to the steel plate only for the purpose of the striker, thereby reducing the number of components.

The entire basic frame member 20 is not necessarily included in the forming member 30. However, it may be preferable to embed all ends of the rod-shaped materials such as the wires 23 configuring the basic frame member 20 in the forming member 30. Also, it may be preferable to hide edges of the plate-shaped brackets attached to the basic frame member 20 in the forming member 30. If the metallic end or edge is exposed to an outside of the forming member 30, passengers sitting on front and rear seats may be damaged due to the collision with the end or edge when a vehicle collides. When the forming member 30 is made to have the sufficient hardness, it is possible to meet the Japanese and abroad internal protrusion related laws and regulations without providing a curvature for the end or edge in the forming member 30, in some cases. Therefore, it may be possible to freely design the arrangement of the wires 23 without concerning whether the end is exposed, as long as it is positioned within the forming member 30. Specifically, the foamed resin may be preferably made to have the Shore A hardness of 50 or higher.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A panel-shaped seat back frame used for a seat back of a vehicle seat, the seat back frame comprising:
   a frame member configured by a metallic rod-shaped material, the frame member includes:
      an outer peripheral frame configured by a metallic pipe; and
      a wire extended between portions of the outer peripheral frame; and
   a panel-shaped forming member of a hard foamed resin that covers the frame member, the panel-shaped forming member includes an opening that exposes a part of the wire of the frame member, wherein
   the exposed part of the wire comprises a striker of a lock mechanism of the seat back, and
   the metallic pipe is arranged at a peripheral part within the panel shaped forming member.

2. The panel-shaped seat back frame according to claim 1, wherein
   the hard foamed resin includes any one of a polypropylene foam, a polyethylene foam, a polystyrene foam and a composite foamed resin thereof, which are manufactured by a bead method, or any one of a hard polyurethane foam and a semi-hard polyurethane foam.

3. The panel-shaped seat back frame according to claim 1, further integrally comprising:
   a headrest frame for a headrest configured to support a head part of a passenger, wherein a part of the outer peripheral frame is shaped to pass through an inside of the headrest frame.

4. A seat back of a vehicle seat for supporting a back of a passenger, the seat back comprising:
the seat back frame according to claim 1; and
a soft pad member which has a cushioning characteristic and is interposed between a front surface of the seat back frame and a back of the passenger.

5. The panel-shaped seat back frame according to claim 1, wherein
the panel-shaped forming member includes a flat surface on a back side of the panel shaped forming member,
the seat back frame is configured to be laid down forwardly into a substantially horizontal position, and
when the seat back frame is laid down forwards, the flat surface is configured to support a luggage thereon.

\* \* \* \* \*